United States Patent

Häfner et al.

[11] Patent Number: 5,325,716
[45] Date of Patent: Jul. 5, 1994

[54] APPARATUS FOR DETERMINING THE PRESSURE DISTRIBUTION ALONG A LIMITED DISTANCE AND METHOD FOR MANUFACTURING IT

[75] Inventors: Hans W. Häfner, Aichach/Walchshofen; Gerhard Altmayer, Rehlingen-Siersburg, both of Fed. Rep. of Germany

[73] Assignee: Pfister Messtechnik GmbH, Augsburg, Fed. Rep. of Germany

[21] Appl. No.: 832,860

[22] Filed: Feb. 7, 1992

[30] Foreign Application Priority Data

Feb. 12, 1991 [DE] Fed. Rep. of Germany ....... 4104177
May 10, 1991 [DE] Fed. Rep. of Germany ....... 4115292

[51] Int. Cl.[5] .............................................. G01F 23/18
[52] U.S. Cl. .................................... 73/301; 73/290 R; 73/299; 29/621.1; 264/279.1
[58] Field of Search ................... 73/290 R, 299, 301; 340/612, 614, 626; 29/621.1; 264/279.1

[56] References Cited

U.S. PATENT DOCUMENTS

| | | | |
|---|---|---|---|
| 3,153,342 | 10/1964 | Pierce et al. | 73/301 |
| 3,290,938 | 12/1966 | Miller | 73/290 R |
| 3,550,447 | 12/1970 | Beresic | 73/301 |
| 3,583,221 | 6/1971 | Ehrenfried et al. | 73/301 |
| 3,792,407 | 2/1974 | Ehrenfried et al. | 73/301 X |
| 4,007,636 | 2/1977 | Wahl | 73/290 R |
| 4,799,381 | 1/1989 | Tromp | 73/146 |

*Primary Examiner*—William A. Cuchlinski, Jr.
*Assistant Examiner*—W. Morris Worth
*Attorney, Agent, or Firm*—Gerald E. Linden

[57] ABSTRACT

An apparatus for determining the pressure distribution along a limited distance comprises a plurality of pressure sensors arranged at predetermined distances to each other and connected to an evaluation circuit, the pressure sensors being arranged, in particular embedded, in/at a preferably round rope-type body of elastomeric material, the body being surrounded by a non-elastic, however in radial direction deformable cover in fixed connection thereto. The apparatus may be advantageously used as a filling level indicator in a bin or for various other purposes.

17 Claims, 3 Drawing Sheets

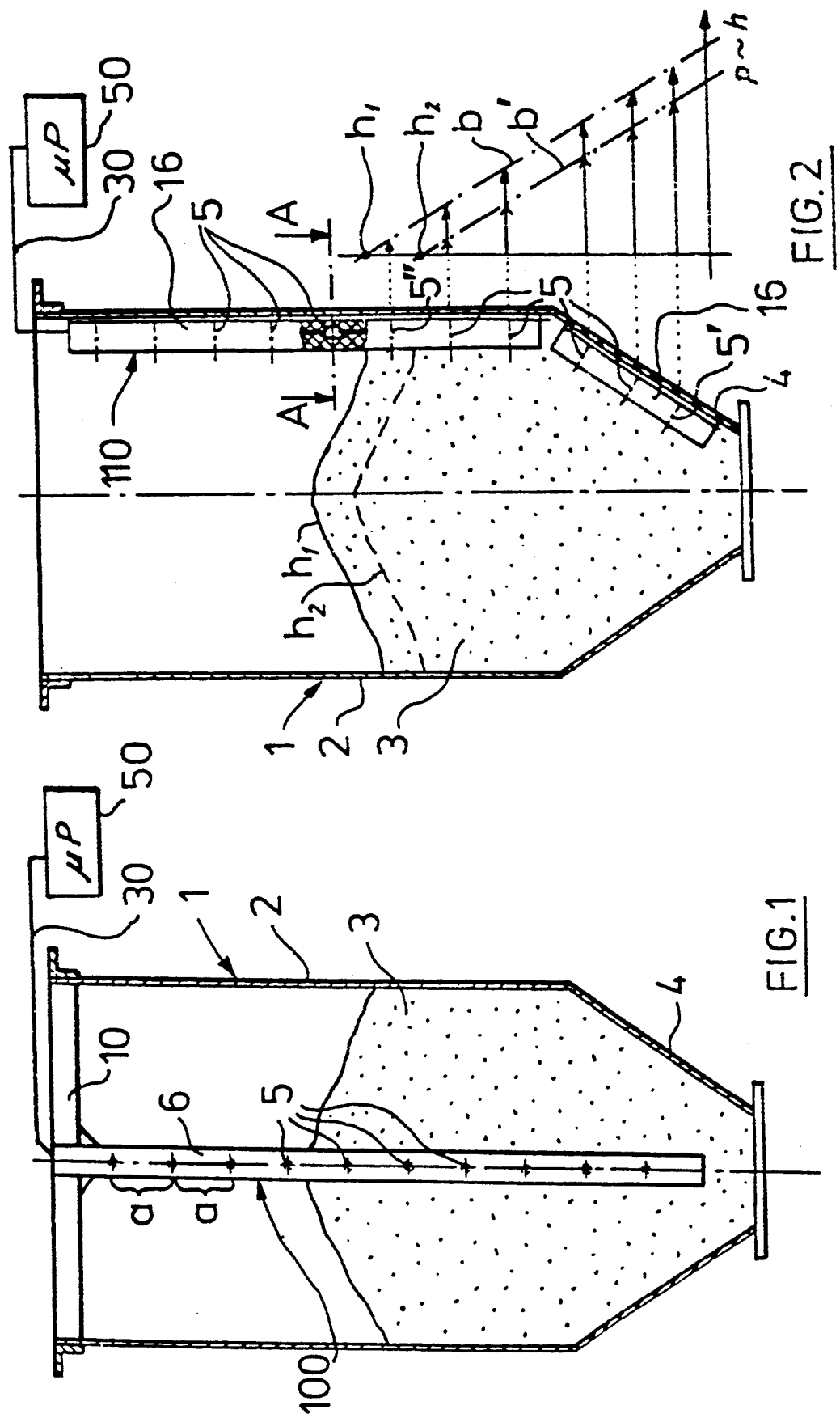

APPARATUS FOR DETERMINING THE PRESSURE DISTRIBUTION ALONG A LIMITED DISTANCE AND METHOD FOR MANUFACTURING IT

FIELD OF THE INVENTION

The invention relates to an apparatus for determining the pressure distribution along a limited distance and a method for manufacturing it.

FIELD OF THE ART

In the technical field a frequent problem is to determine the pressure distribution along a limited distance as accurately as possible. A specific use of such a measurement is the filling level indication in a bin containing liquid or pourable material.

DE-A1-35 33 070 discloses such a filling level indicator comprising pressure measuring cells provided with strain gauges and inserted into recesses formed at vertical distances in the inner side of the bin wall. These cells are connected to an evaluation circuit. During emptying of the bin one cell after the other is deloaded from the pressure caused by the filling material and the signal generated by it indicates the current filling level. However, the forming of such recesses and the assembly of the pressure measuring cells are complex and labour intensive. Furthermore, there may arise sealing problems between the recesses and the pressure measuring cells.

The situation is similar for a single pressure sensor according to U.S. Pat. No. 4,770,050, inserted in an opening of a bin wall flush with its inner surface such that the pressure existing in the bin acts against a piston surface and is uniformly transmitted through elastomeric material to a pressure sensor comprising a measuring diaphragm. The pressure sensor is connected to an evaluation circuit such that its measuring values may be displayed and evaluated. Again, it is of disadvantage that there must be provided an opening in the bin wall for the pressure sensor which must be sealed in an expensive manner, particularly for pourable filling material.

DE-A1-36 41 482 discloses a filling level sensor using a diaphragm switch and comprising a disk-type housing attached with the diaphragm to an opening of the bin. DE-C2-33 27 047 discloses a liquid level detector suspended by a coaxial cable in the bin and comprising temperature sensitive feelers immersing into a bin at different heights. DE-C3-31 48 383 relates to a filling level indicator for a vehicle fuel tank using a probe having provided thereon individual temperature-dependent resistors at partially varying distances. DD-A1-247 971 relates to a filling level indicator comprising a piezoresistive pressure transducer immersing into the liquid and Suspended at a conductor at a predetermined height.

SUMMARY OF THE INVENTION

It is a principal object of the invention to provide an apparatus for determining the pressure distribution along a limited distance having a simple and robust design, being inexpensive to manufacture and which may be used in great variety.

It is a further object of the invention to provide an apparatus for determining the filling level of liquids or pourable materials in containers having a simple and robust design, being inexpensive to manufacture and which may be used in great variety, and there shall be named preferred uses of such apparatuses.

It is a still further object of the present invention to provide a simple and inexpensive method for manufacturing such apparatuses.

According to one aspect of the invention an apparatus for determining the filling level of liquids or pourable materials in containers comprises a support element of substantially linear extension covering a level difference to be measured and being of a high longitudinal tensile strength whilst being flexible in at least one lateral direction; a plurality of pressure sensor means distributed linearly along said support element; electrical conductor means connected to said pressure sensor means; and evaluation means connected to said electrical conductor means for receiving measuring signals from each of said pressure sensor means, and evaluating said measuring signals for providing said filling level.

According to another aspect of the invention an apparatus for determining the pressure distribution along a limited distance comprises a support element of substantially linear extension and of high longitudinal tensile strength whilst being flexible in at least one lateral direction; a plurality of pressure sensor means distributed linearly along said support element; electrical conductor means connected to said pressure sensor means; and evaluation means connected to said electrical conductor means for receiving measuring signals from each of said pressure sensor means, and evaluating said measuring signals for providing said pressure distribution.

According to a still further aspect of the invention a method for manufacturing an apparatus for determining the pressure distribution along a limited distance comprises the steps of: providing a linear member of substantial length; arranging a plurality of pressure sensor means in a spaced linear distribution along said member; arranging electrical conductor means connected to said pressure sensor means along said member; and applying elastomeric material along said member for embedding said pressure sensor means and fixedly adhering to said member.

Several embodiments of the invention will be explained in detail hereinafter referring to the drawings.

BRIEF DESCRIPTION OF THE DRAWINGS

FIG. 1 is a vertical sectional view through a bin illustrating a first embodiment of the apparatus for measuring the filling level;

FIG. 2 is a vertical sectional view through a bin using a further embodiment of the filling level measuring apparatus and a schematic measuring value diagram associated thereto;

BEST MODE OF CARRYING OUT THE INVENTION

Figure 3:
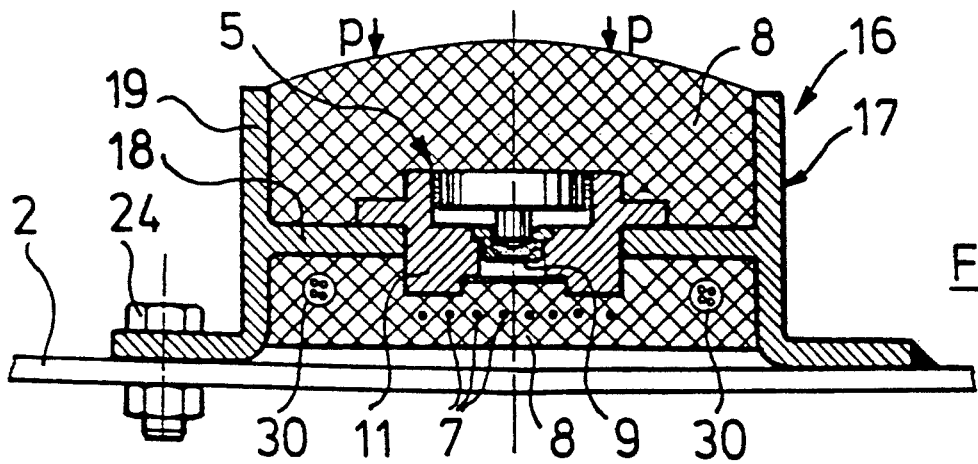
FIG. 3 is a cross sectional view along the line A—A in FIG. 2 through the support element.

FIG. 1 illustrates a first embodiment of an apparatus of the invention, specifically a filling level indicating device 100 arranged in a bin or tank 1 having a wall 2. Material 3, e.g. a liquid or pourable material, is filled into bin 1 and may be removed through an outlet funnel 4. A plurality of practically dot-like pressure sensors 5 is arranged at or in a longitudinal support element 6 of device 100 at predetermined, preferably uniform distances a. The support element 6 may have a desired cross section and is secured to an upper fixture 10 suspending into bin 1 up to a considerable depth, i.e. almost to the bottom thereof.

In order to avoid measuring errors due to movements of the pourable material, support element 6 is of high tensile strength in its vertical longitudinal extension, however relatively elastic in cross-sectional direction (see illustrations in FIGS. 3 to 5), such that radial deformations of support element 6 will not cause errors in the measurements of the pressure sensors 5. Preferably, support element 6 is provided with additional reinforcement elements 7 (see FIG. 3) such that the pressure sensors 5 are maintained at predetermined depths in the bin 1.

FIG. 2 illustrates as an alternative embodiment of the invention a device 110 comprising a support element 16 for pressure sensors 5. Here, support element 16 is secured, e.g. welded or stuck to the inner surface 2 of the bin 1. One of the pressure sensors 5 arranged at about half-height in support element 16 is schematically shown in partial section. With the illustrated filling level of material 3 within bin 1 the pressure and measuring value distribution will essentially be as illustrated in the schematic diagram in FIG. 2, right-hand side, with the lowest pressure sensor 5' arranged in outlet funnel 4 indicating the largest measuring value according to the static pressure. The pressure decreases continuously according to the height position of the individual pressure sensors 5. With a uniform design and a uniform distance a of the pressure sensors 5 measuring values are generated according to the diagram located approximately on a straight line as a measuring curve b which intersection with the axis of the ordinate represents the actual filling level $h_1$.

If in the course of time one of the pressure sensors 5 breaks down, its measuring value would be far below or above the measuring curve b represented as a straight line, such that this pressure sensor may be detected and its generated measuring value disregarded when forming the measuring result. The plurality of measuring positions permits the accurate determining of the measuring curve b on the basis of the individual measuring values and the course of the curve, in particular its inclination, resulting in high accuracy and safety of measurement. Such an evaluation may easily be performed by means of well-known summing and integrating methods by means of an also well-known evaluation circuit 50. A simple example is the determination of the intersection of the straight line (or other curve) with the axis of the ordinate. Due to the plurality of measuring values an accurate continuous indication of the filling level is achieved as a point of intersection $h_1$ between two adjacent pressure sensors.

Now it is assumed that the lowest pressure sensor 5' arranged in the outlet funnel 4 indicates a measuring value of e.g. 60 bars. The consecutive measuring values in upward direction may then be 50 bars, 40 bars, 30 bars, 20 bars and 10 bars, resulting in an inclination of 60° of curve (straight line) b in respect of the axis of the abscissa. Now, if upon removal of material the filling level is reduced as indicated in dashed lines, there is no more pressure acting onto pressure sensor 5" located below the section line A—A and all the individual measuring values will for instance be 10 bars lower. Again, the course of the curve will be a straight line b' intersecting the axis of the ordinate at filling level $h_2$.

Therefore, the measuring curves b and b', etc., form a family of curves, any irregularities being determined and easily corrected by evaluation circuit 50.

Of course, dependent on the shape of the bin and the locations of the pressure sensors, measuring curves b may be sections of a parabola or any other curve. Theoretically, the measuring curves are predetermined by the individual distances of the pressure sensors 5 to each other. In practice, calibration of the apparatus is accomplished e.g. by determining the actual shape of the curve (in the example the straight line b with an inclination of 60°) representative and characteristic for future practical filling level measurements and by determining the curve family with bin 1 first preferably completely filled. With this situation all pressure sensors 5 will generate measuring values offering a determination of measuring curve b on the basis of as many measuring values as possible in a most reliable manner. The filling level may then be reduced gradually and the corresponding measuring values may be determined again. Instead of such an empiric determination of the shape of the curve the latter may be determined by simulation with the arrangement having a reduced scale.

It should be noted that for a coarse filling level measurement it may be sufficient to determine the pressures sensors 5 each under pressure without determining their accurate measuring value such that the distance a between the individual pressure sensors 5 is a measure for the measuring accuracy achievable in respect of the filling level. With the example illustrated in FIG. 2 pressure sensor 5 crossed by section line A—A is not yet covered by material 3, whilst pressure sensor 5" located below is already loaded. Thus, the filling level may be indicated as being located between these two adjacent pressure sensors, since their height position is known in view of the stationary position at support element 16.

FIG. 3 is a cross sectional view of the device 110 along the cross-sectional line A—A of FIG. 2. Support element 16 essentially comprises a preferably H-type profile bar 17, preferably formed of metal, having two side webs 19 and a connecting web 18. Support element 16 is secured to the inner surface of bin wall 2 at perpendicularly bent-off ends 24 of side webs 19, e.g. welded thereto or screwed thereto at a few positions, as indicated in the left-hand half of FIG. 3. A few screwing positions 24 are sufficient in the upper region of bin 1 which is usually easily accesible. The pressure sensors 5 are inserted into the connecting web 18 which is hermetically sealed against material 3 by a permanently elastic cover 8. Pressure sensors 5 comprise in a preferred embodiment a pressure sensor diaphragm 9 at the side opposite the side of pressure p and are connected to the evaluation circuit 50, e.g. a well-known microprocessor, by cables 30 extending within cover 8 of support element 16. A pressure sensor which preferably may be used is, for example, disclosed in U.S. Pat. No. 4,984,468. Reinforcements 7 may be provided in the region of the side webs 19 and may be formed by covers of the cables 30 having a large tensile strength; vice versa reinforcements 7 may be formed as signal transmitting cables as such.

A hat-type support 11 of pressure sensor 5 is inserted into connection web 18 receiving in turn a sensor body including the pressure sensor diaphragm 9.

Figure 4:
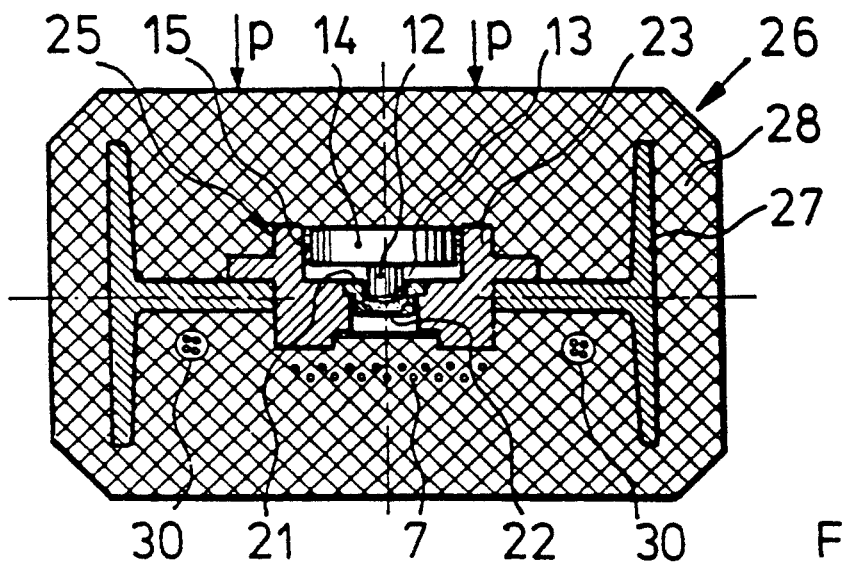
FIG. 4 is a modified embodiment according to FIG. 3.

FIG. 4 is a view of a cross section taken along line A—A in FIG. 2 of a modified embodiment of a support element 26. In this case profile bar 27 is completely surrounded by a cover 28. This device is particularly adapted for a suspended use according to FIG. 1. Pressure sensors 25 essentially comprise a hat-type ceramic sensor body 21 having a thin diaphragm 22, the rear side of which is provided with known strain gauges, preferably in thick film technology, which strain gauges cause a change in resistance in proportion to pressure p and the corresponding deformation of diaphragm 22 and transmit a corresponding signal through cables 30 to evaluation circuit 50. Pressure introduction to diaphragm 22 is accomplished by means of a pressure introduction piston 14 guided with low friction along its exterior periphery in a support 23 with elastomeric material filling an annular gap 15 therebetween. The elastomeric material fixedly adheres to the surfaces of annular gap 15. It is filled in by vulcanizing and is bubble-free, as disclosed in U.S. patent applications Ser. No. 648,259 and No. 648,804 the full contents of which are made part of this application by reference. This measure ensures a more uniform pressure introduction with a further uniforming being achieved by a further annular gap 13, again filled with the elastomeric material mentioned above. In this annular gap 13 a piston-type stud 12 of pressure introduction plate 14 is inserted, acting through the elastomeric material in its bottom region onto diaphragm 22.

Figure 5:
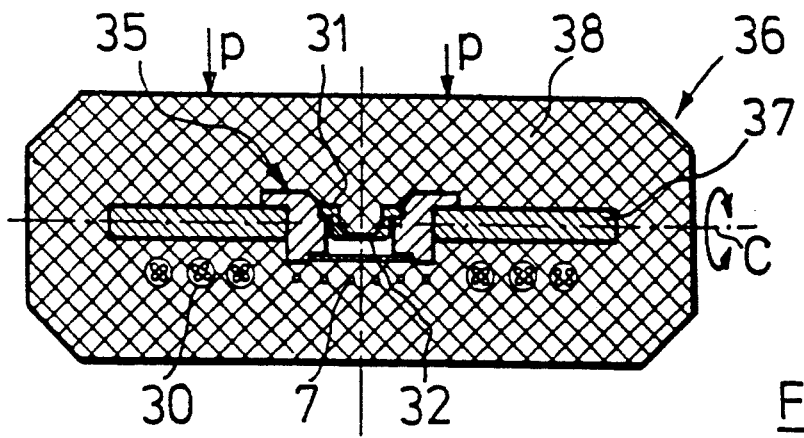
FIG. 5 is a further modified embodiment.

FIG. 5 illustrates a further embodiment of a device 100 or 110 comprising a support element 36 including a profile bar 37 and being formed relatively flat like a strip or belt, such that it is relatively elastic about axis c; thus, support element 36 may be attached to a not completely planar interior surface of bin wall 2. Support element 36 may even be rolled or wound up and stored and transported in wound form. With a freely suspended design according to FIG. 1 such an elastic embodiment permits a certain deflection without causing measurement errors.

In contrast to the two embodiments described above, pressure sensor 35 of the instant embodiment has a design without additional pressure introduction piston 14 and stud 12 (FIG. 4). Rather, the elastomeric material of cover 38 directly acts onto sensor body 31 and diaphragm 32 upon pressure exertion. It should be noted that with all embodiments pressure sensors 5, etc. are completely encapsulated in the support element 16, etc. such that they are not damaged by material 3. The result is a very wear-resistant and robust measuring apparatus having a high measuring accuracy and safety.

Figure 6:
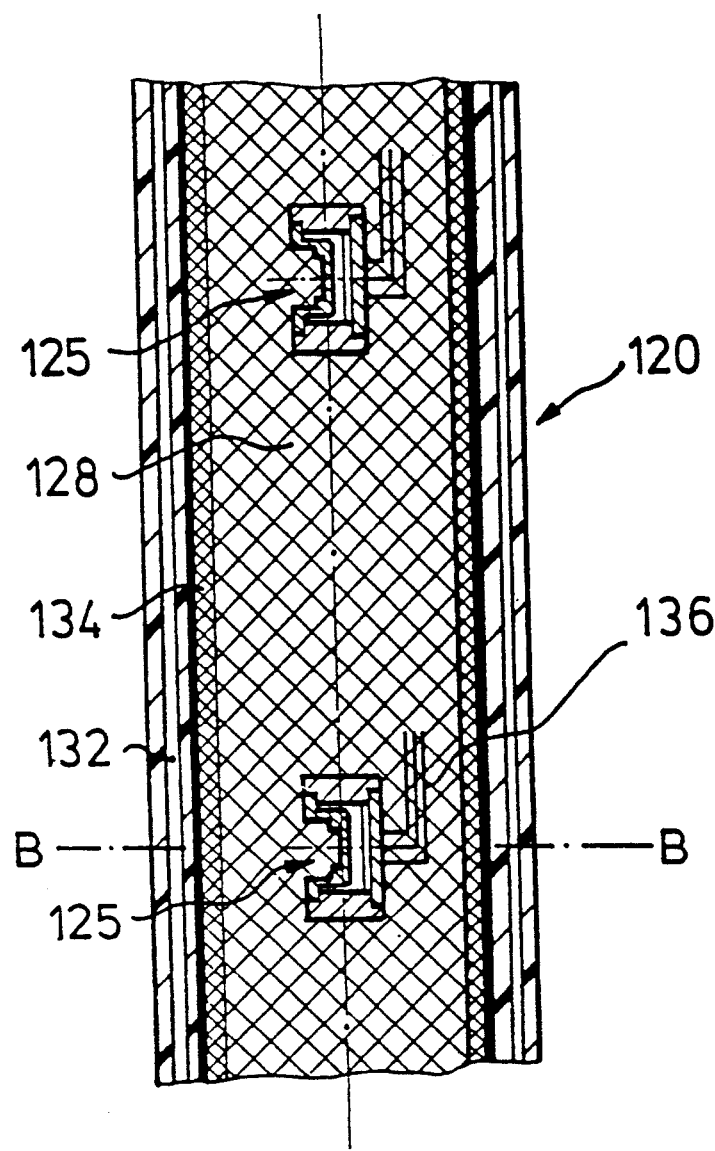
FIG. 6 is an axial longitudinal section through a portion of a further embodiment of the apparatus according to the invention.
Figure 7:
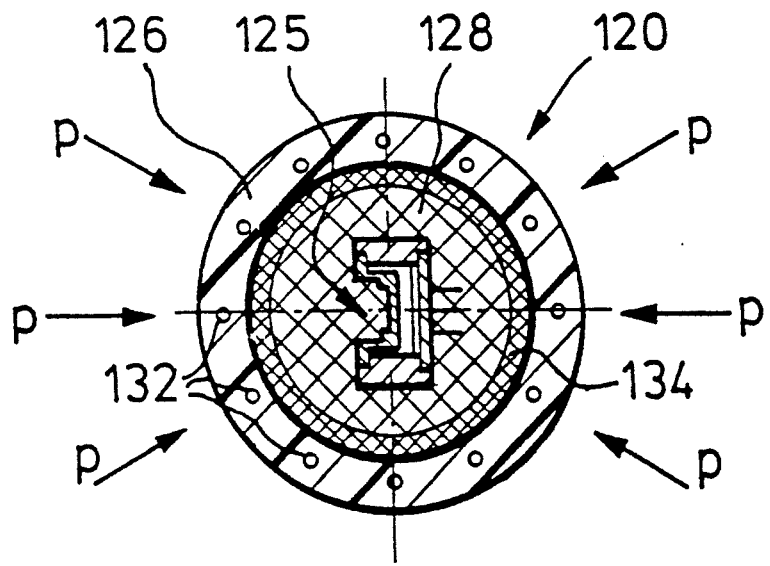
FIG. 7 is a cross sectional view along the line B—B in FIG. 6.

FIGS. 6 and 7 illustrate a portion of an embodiment of a device 120 of the invention comprising pressure sensors 125 (viz. FIGS. 3 and 5) arranged at distance to each other and completely embedded in a body 128 of elastomeric material having a round, preferably a circular or oval cross section.

As regards the principle design of the device 120, the design and arrangement and circuit connection of the pressure sensors and the use of the apparatus of the invention, reference is made to the description of the preceding embodiments. Therefore, the instant description is restricted to modifications and improvements as compared with those embodiments.

Body 128 is surrounded by a cover 126 which is non-elastic in axial and preferably in peripheral directions, but is deformable in radial direction. Cover 126 may be a hose made of synthetic material having embedded therein axially extending non-elastic fibres 132 exemplary of metal or synthetic material in peripheral distribution. Instead of an axial extension of fibres 132 a helical arrangement may be used as well. For most applications the exterior surface of cover 126 should be wear-resistant, specifically for level measurements in bunkers. Cover 126 may be formed as a (metal) fabric as well. Body 128 is formed of elastomeric material which is incompressible as much as possible, for example of bubble-free natural or silicon rubber, or similar materials, as exemplary listed in U.S. Pat. No 4,644,805 for similar purposes Though as pressure sensors 125 preferably those of the preceding embodiments are used, any other type of pressure sensors may be used as well.

With this embodiment the body 128 is fixedly secured by elastomeric material to the inner peripheral surface of cover 126, which elastomeric material is filled in into annular gap 134.

Hereinafter various alternatives for manufacturing the body 128 and its inserting into cover 126, respectively, are explained by way of example:

A first alternative of manufacturing body 128 comprises arranging pressure sensors 125 in a tube-type mould. Dependent on the circuit connections to be explained in more detail below, either at least one line mechanically (and electrically) connecting all sensors with the evaluation circuit 50 or a type of cable bundle 136 is used, if one individual line is provided for each pressure sensor. The individual pressure sensors 125 or -depending on the stiffness- the line portions therebetween are provided with corresponding radial distance elements, as well-known in the moulding art. Depending on the length of body 128 to be produced and its diameter either a closed straight tube may be used as a mould into which the "armoured" pressure sensor/line arrangement is pushed or pulled in, or the tube is longitudinally split which makes it easier to insert the pressure sensor/line arrangement. For large lengths instead of a straight tube a tube coil (longitudinally splitted) similar to a heating or cooling coil may be used.

Furthermore, extruding of body 128 may be considered.

For inserting body 128 into cover 126 various alternatives are available:

A first alternative is to loosely insert body 128 into cover 126 formed as a hose after treating the opposing exterior and interior peripheral surfaces, respectively, with a primer or wetting agent. The remaining gap is then filled with a relatively liquid curable material, as silicon or natural rubber or a two component synthetic material, which materials are then vulcanized and/or hardened, respectively, warm or cold, such that there is achieved a fixed adhering of the material to the contact surfaces. A uniform gap may be achieved by knops or projections or the like, formed at the periphery of body 128.

A second alternative to insert body 128 into cover 126 comprises applying a considerable pressure onto the latter, preferably with one end closed, such that it expands radially enabling the introduction of body 128. After removing pressure cover 126 fixedly engages body 128; thus, vulcanizing or adhering processes may not be required.

As a third alternative for inserting body 128 into cover 126 expansion of body 128 may be considered. This may be achieved by providing cavities in body 128, connected by at least one axially extending duct or providing only one duct axially passing through body 128. The latter and/or the cavities, respectively, will be filled with liquid after loosely inserting body 128 into cover 126 such that body 128 is expanded and fixedly engages the inner peripheral surface of cover 126. The liquid may either be curable resulting in a permanently stable arrangement or the inlet of the duct may releasably be closed such that, if desired, pressure may be reduced and body 128 may be removed from cover 126.

As a further alternative reference is made to well-known extruding methods.

An alternative form of cover may consist in helically winding a non-elastic tape around body 128.

Now, further details relating to the electrical circuitry for the pressure sensors shall be explained.

Accordingly, the pressure sensors 125 may comprise corresponding (ASIC) chips permitting an individual scanning by the evaluation circuit 50. Such a scanning may be done either through a single (or double) line serially or in a byte-parallel manner through a bus having a corresponding byte width. Each pressure sensor 125, for example, has an individual identification and the various pressure sensors 125 are sequentially accessed by the microprocessor of the evaluation circuit 50. Alternatively, the scanning may forcibly be advanced from one pressure sensor to the next such that no identification is required, but only a sequencing circuit indicating the changing state.

For supply power to the individual pressure sensors the scanning pulse itself may be sufficient, converted into direct current and applied to the resistor measuring bridge of the pressure sensor 125. The resulting analog signal is converted into a digital signal and is returned, e.g. via a ring circuit, as a response signal to the evaluation circuit 50.

Evaluation circuit 50 then performs the calculations as explained above.

Up to now, as an application of the apparatus of the invention it has been referred to measuring the filling level of a bin or other container.

However, the apparatuses of the invention permit a much greater variety of use:

In principle, the apparatus of the invention may be used wherever pressure changes or the pressure distribution, respectively, along a limited larger distance are to be determined.

Further examples for a vertical application are the immersion into liquids in which the effects of flow motions, pressure waves, explosions, etc., are to be determined in respect to level.

As a further example the compactness of concrete during the concreting of objects having a larger height may be determined.

However, even non-vertical applications may be considered.

Thus, the apparatus of the invention may be inserted across into a street lane and may be used for determining where or when a vehicle crosses above the apparatus.

Furthermore, the uniform or non-uniform loading, respectively, of a support by a large object, for example a pillar, a container, a building, or the like, may be determined.

In view of its cable-type design the apparatus of the invention may be pressed into the ground like a cable.

Summing up, the invention provides an apparatus having a variety of applications, a relatively inexpensive production and a simple design.

In terms of measuring the filling level and pressure distribution of a pourable liquid or solid being filled or emptied from a container (vessel), such as a bin or hopper, the invention is directed to apparatus for measuring the level and pressure, a method of measuring the level and pressure, and a method of manufacturing the apparatus. The disclosed techniques are applicable to a number of other uses, as mentioned hereinabove.

Generally, a relatively rigid, relatively inextensible support element is suspended longitudinally (vertically) within the container (see support element 6 in FIG. 1) or is secured to an inner surface of the container (see support element 16 in FIG. 2).

A plurality of pressure sensors (e.g., pressure sensors 5 of FIG. 1) are disposed at intervals along the longitudinal extent of the support element. The sensors may be spaced-apart at regular intervals "a" (see FIG. 1) along the support element, or may be spaced-apart at irregular intervals along the support element.

The support element and sensors are assembled as a covered unit (see covers 8, 28, 38 and 126 in FIGS. 3, 4, 5 and 7, respectively), while allowing the material contained within the vessel to exert a force on the sensors.

Each sensor provides an output signal (not shown) to an evaluation circuit (shown as $\mu P$ 50 in FIG. 2) indicative of the force exerted by the contained material on each particular sensor. In this manner, sensors at different levels (vertical positions along the extent of the support element) provide indications of whether the vessel is filled to at least that level.

The evaluation circuit is preferably implemented as a microprocessor, suitably programmed to process the output signals of the sensors to provide information on the filling level of the vessel.

The sensors are preferably implemented using integrated circuit strain gauges, such as Application Specific Integrated Circuits (ASICs).

In a simple example of the measuring technique of the present invention, a plurality of sensors are disposed at evenly-spaced vertical intervals along a support element extending into the vessel. The physical position of each sensor within the vessel is readily known. For a given level of material within the vessel, sensors located at or below that level will provide an output signal indicative of force being exerted by the material. Sensors above the level of the material will provide an output signal indicating that there is no material at that level.

The output signals of the sensors may be monitored "existentially", which is to say to determine whether or not there is material at the level of a particular sensor. This could be done simply by converting the output signals of the sensors to a logic "1" or a logic "0", and would provide only a coarse indication of material level.

The output signals of the sensors may also be provided as analog or digital signals, the strength (or value) of which is directly related to the force exerted on a sensor by the material. In this manner, the material level between two sensors can be determined. For example, as material is being emptied from the vessel, the outputs of successively lower sensors will drop to zero. Meanwhile, the outputs of covered sensors will decline according to the amount of material remaining above the sensor.

Evidently, one sensor at the bottom of the vessel could provide an indication of the amount of material above that sensor in the vessel. However, if that single sensor fails, the entire technique for monitoring material level fails.

By using a plurality of sensors, reliability is increased. As mentioned hereinabove, a curve ( e.g., "b" in FIG. 2 ) of pressure values can be obtained for the sensors. In the event that a particular sensor fails (high/low/etc.), the failure can readily be determined by the evaluation circuit which will notice that the output does not fit the curve generated by the majority of the sensors.

Evidently, the evaluation circuit can be programmed to take into account the shape of the vessel. For example, in a cylindrical vessel, evenly-spaced sensors should provide a linear curve of outputs—the sensor positioned lowest on the support element providing the highest output. (This assumes a uniform density of material filling the vessel.) Unevenly-spaced sensors would provide a non-linear curve of output values. In any case, a particular sensor that is not operating properly is readily identified by the evaluation circuit.

For a non-cylindrical vessel, evenly-spaced sensors will provide a non-linear curve of output values - the curve being related to the geometric shape of the vessel. (Again, a uniform density of filling material is assumed.) On the other hand, the sensors can be non-evenly spaced, according to the geometry of the vessel, so that their outputs fit a linear curve. This would simplify the implementation of the evaluation circuit.

In a digital embodiment of the invention, each sensor can be provided with an address identifying the particular sensor. In this manner, the sensors can be polled (scanned; interrogated) sequentially on a common communication line (bus) by the evaluation circuit, thereby reducing the number of wires required.

In the FIG. 6 embodiment, the sensors 125 can be positioned for moulding (molding) within the elastomeric body 128 using standoff elements to position the sensors radially within the body.

The teachings of the above-mentioned U.S. Pat. Nos. 4,770,050, 4,984,468 and 4,644,805 are incorporated by reference herein.

We claim:

1. Apparatus for determining a filling level of liquids or pourable materials in containers comprising:
    a support element of substantial linear extension extending over a range of longitudinal filling levels of a liquid or pourable material to be measured in a container and of a high longitudinal tensile strength and flexible in at least one lateral direction;
    a plurality of pressure sensor means, distributed longitudinally at spaced-apart positions along the linear extension of said support element, for sensing a pressure exerted on the support element be a substance filling the container to a longitudinal filling level, and for providing a corresponding plurality of measuring signals, each measuring signal indicative of said pressure at the longitudinal position of a selected one of the sensor means;
    a plurality of electrical conductor means, each connected to a respective one of said pressure sensor means, for conveying said measuring signals from the pressure sensor means; and
    evaluation means, connected to said electrical conductor means, for receiving the measuring signals from each of said pressure sensor means, and for evaluating said measuring signals for determining the filling level at which the substance is filling the container;
    wherein:
    said support element is formed of elastomeric material;
    said pressure sensor means are embedded in the elastomeric material and covered by the elastomeric material; and
    said elastomeric material transmits the pressure from the substance filling the container to said pressure sensor means;
    further comprising:
    reinforcement means disposed in said elastomeric material for reinforcing the support element;
    wherein:
    said reinforcement means is a longitudinally extending profile bar; and
    said profile bar has a longitudinally extending web portion provided with a plurality of spaced-apart through-holes for receiving said plurality of pressure sensor means.

2. Apparatus, according to claim 1, wherein:
    said reinforcement means are fibers of material selected from the group consisting of metal and synthetic material.

3. Apparatus, according to claim 1, wherein:
    said reinforcement means comprises said electrical conductor means.

4. Apparatus, according to claim 1, wherein:
    an end of said support element is provided with means for suspending said support element in said container.

5. Apparatus, according to claim 1, wherein:
    said support element is provided with means for attaching said support element in an essentially vertical arrangement to an interior surface of a peripheral wall of said container, 6. Apparatus for determining a filling level of liquids or pourable materials in containers comprising:
    a support element of substantial linear extension extending over a range of longitudinal filling levels of a liquid or pourable material to be measured in a container and of a high longitudinal tensile strength and flexible in at least one lateral direction;
    a plurality of discrete individual pressure sensor means, distributed longitudinally at spaced-apart positions along the linear extension of said support element, for sensing a pressure exerted on the support element by a substance filling the container to a longitudinal filling level, and for providing a corresponding plurality of measuring signals, each measuring signal indicative of said pressure at the longitudinal position of a selected one of the sensor means;
    a plurality of electrical conductor means, each connected to a respective one of said pressure sensor means for conveying said measuring signals from the pressure sensor means; and
    evaluation means, connected to said electrical conductor means, for receiving the measuring signals from each of said pressure sensor means, and for evaluating said measuring signals for determining the filling level at which the substance is filling the container;
    wherein:

said support element is of a rove-type form and comprises:

a body element formed of a elastomeric material and having an essentially circular cross-section;

said pressure sensor means are embedded in the elastomeric material;

further comprising:

a cover element fixedly surrounding said body element; and said cover element having a high longitudinal tensile strength, being non-elastic in a peripheral direction, and being deformable in at least one radial direction;

wherein:

said cover element is of a hose-type form;

further comprising:

a gap disposed between contact surfaces of said body element and said cover element;

wherein:

the gap is filled with elastomeric material fixedly adhering to the contact surfaces of the cover element and the body element.

7. Apparatus for determining a filling level of liquids or pourable materials in containers comprising:

a support element of substantial linear extension extending over a range of longitudinal filling levels of a liquid or pourable material to be measured in a container and of a high longitudinal tensile strength and flexible in at least one lateral direction;

a plurality of discrete individual pressure sensor means, distributed longitudinally at spaced-apart positions along the linear extension of said support element, for sensing a pressure exerted on the support element by a substance filling the container to a longitudinal filling level, and for providing a corresponding plurality of measuring signals, each measuring signal indicative of said pressure at the longitudinal position of a selected one of the sensor means;

a plurality of electrical conductor means, each connected to a respective one of said pressure sensor means for conveying said measuring signals from the pressure sensor means; and evaluation means, connected to said electrical conductor means for receiving the measuring signals from each of said pressure sensor means, and for evaluating said measuring signals for determining the filling level at which the substance is filling the container;

wherein:

said support element is of rope-type form and comprises:

a body element formed of elastomeric material and having an essentially circular cross-section;

said pressure sensor means are embedded in the elastomeric material;

further comprising:

a cover element fixedly surrounding said body element; and said cover element having a high longitudinal tensile strength, being non-elastic in a peripheral direction, and being deformable in at least one radial direction;

wherein:

said cover element is of hose-type form and said body element is provided with a fluid duct; and said fluid duct extends in the longitudinal direction and is filled with pressurized fluid for maintaining close engagement of said cover element to said body element.

8. Apparatus for determining a filling level of liquids or pourable materials in containers comprising:

a support element of substantial linear extension extending over a range of longitudinal filling levels of a liquid or pourable material to be measured in a container and of a high longitudinal tensile strength and flexible in at least one lateral direction;

a plurality of discrete individual pressure sensor means, distributed longitudinally at spaced-apart positions along the linear extension of said support element, for sensing a pressure exerted on the support element by a substance filling the container to a longitudinal filling level, and for providing a corresponding plurality of measuring signals, each measuring signal indicative of said pressure at the longitudinal position of a selected one of the sensor means;

a plurality of electrical conductor means, each connected to a respective one of said pressure sensor means for conveying said measuring signals from the pressure sensor means; and evaluation means, connected to said electrical conductor means, for receiving the measuring signals from each of said pressure sensor means, and for evaluating said measuring signals for determining the filling level at which the substance is filling the container;

wherein:

said support element is of a rope-type form and comprises:

a body element formed of elastomeric material and having an essentially circular cross-section;

said pressure sensor means are embedded in the elastomeric material;

further comprising:

a cover element fixedly surrounding said body element; and said cover element having a high longitudinal tensile strength, being non-elastic in a peripheral direction, and being deformable in at least one radial direction;

further comprising:

a plurality of electronic means, connected between the plurality of pressure sensor means and the plurality of electrical conductor means, for conditioning the plurality of measuring signals;

wherein:

said evaluation means is adapted to sequentially interrogate individual ones of said electronic means for sequentially receiving individual ones of the measuring signals therefrom; and said evaluation means is responsive to a number of said measuring signals for determining said filling level.

9. Apparatus for determining a pressure distribution along a limited distance comprising:

a support element of substantial linear extension and of high longitudinal tensile strength and flexible in at least one lateral direction;

a plurality of pressure sensor means, distributed at spaced-apart linear positions along said support element, for sensing pressure exerted upon the support element;

electrical conductor means, connected to said pressure sensor means, for providing signals from said pressure sensor means; and evaluation means, connected to said electrical conductor means, for receiving the signals from each of said pressure sensor means, for evaluating said signals, and for determining a pressure distribution along said support element;

wherein:

said support element is formed of elastomeric material;

said pressure sensor means are embedded in the elastomeric material; and said elastomeric material transmits pressure exerted on the support element to said pressure sensor means;

further comprising:

reinforcement means are arranged in said elastomeric material for reinforcing said elastomeric material;

wherein:

said reinforcement means is a longitudinally extending profile bar; and said profile bar has a longitudinally extending web portion provided with a plurality of spaced through-holes, each through-hole receiving a corresponding one of said plurality of pressure sensor means.

10. Apparatus, according to claim 9, wherein:

said reinforcement means are fibers formed of material selected from the group consisting of metal and synthetic material.

11. Apparatus, according to claim 9, wherein:

said reinforcement means comprise said electrical conductor means.

12. Apparatus, according to claim 9, wherein:

said support element is provided with fastening means for fastening the support element to a structure.

13. Apparatus for determining a pressure distribution along a limited distance comprising:

a support element of substantial linear extension and of high longitudinal tensile strength and flexible in at least one lateral direction;

a plurality of pressure sensor means, distributed at spaced-apart linear positions along said support element, for sensing pressure exerted upon the support element;

electrical conductor means, connected to said pressure sensor means, for providing signals from said pressure sensor means; and evaluation means, connected to said electrical conductor means, for receiving the signals from each of said pressure sensor means, for evaluating said signals, and for determining a pressure distribution along said support element;

wherein:

said support element is of a rope-type form comprising:

a body formed of elastomeric material, having an essentially circular cross-section and having said pressure sensor means embedded therein; and further comprising:

a cover fixedly surrounding said body, said cover having a high longitudinal tensile strength, being non-elastic in a peripheral direction, and deformable in at least one radial direction;

wherein:

said cover is formed by fabric made of fibers of a material selected from the group consisting of metal and synthetic fibers.

14. Apparatus, according to claim 9, further comprising:

electrical means, connected to said pressure sensor means, for conditioning signals from the pressure sensor means;

wherein:

said evaluation means is adapted receive signals from the electrical means to sequentially interrogate said pressure sensor means for receiving measuring signals therefrom; and said evaluation means uses a plurality of said measuring signals for determining said pressure distribution.

15. A method for manufacturing an apparatus for determining a pressure distribution along a limited distance comprising the steps of:

arranging a plurality of pressure sensors in a spaced-apart linear distribution in a mold having a relatively substantial length and a relatively very small cross-section as compared with said length;

connecting electrical conductors to said pressure sensors in said mold;

filling said mold with curable elastomeric material and hardening the elastomeric material in order to form a rope-type body of substantial length; and surrounding said body with a cover in fixed engagement to the body;

wherein:

the cover is a hose-type cover; and said surrounding step comprises the steps of:

inserting said body in the hose-type cover;

filling a gap between opposing peripheral surfaces of said cover and said body with curable elastomeric material; and hardening said elastomeric material.

16. A method of determining a level of a material within a container, comprising:

providing a linear support member extending longitudinally within the container;

disposing a plurality of discrete individual pressure sensors at longitudinally spaced-apart positions along the support member, each one of the sensors providing corresponding output signal indicative of the pressure exerted upon a selected one of the pressure sensors by material filling the container to a level;

providing the output signals from the plurality of sensors to an evaluation circuit; and determining, with the evaluation circuit, the level of the material in the container based on the values for the output signals;

further comprising:

determining a pressure distribution for the material filling the container based on the values of the output signals; and interpolating, with the evaluation circuit, the level of the material in the container between two sensors based on the pressure distribution.

17. Method, according to claim 16, further comprising:

determining, with the evaluation circuit, a curve of values for the sensor output signals; and discarding particular ones of the plurality of sensor output signals that do not conform to the curve.

* * * * *